United States Patent
Yanou et al.

(10) Patent No.: US 6,471,869 B1
(45) Date of Patent: Oct. 29, 2002

(54) DEVICE AND METHOD FOR PROCESSING CRUDE OIL

(75) Inventors: Manabu Yanou; Michio Kanno; Masaru Uehara, all of Tokyo; Masanori Itakura, Nagoya, all of (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/623,167

(22) PCT Filed: Mar. 1, 1999

(86) PCT No.: PCT/JP99/00967

§ 371 (c)(1),
(2), (4) Date: Aug. 28, 2000

(87) PCT Pub. No.: WO99/43767

PCT Pub. Date: Sep. 2, 1999

(30) Foreign Application Priority Data

Feb. 27, 1998 (JP) .......................... 10-048303
Feb. 27, 1998 (JP) .......................... 10-048306

(51) Int. Cl.[7] .................................. B01D 61/00
(52) U.S. Cl. ............. 210/651; 210/636; 210/195.2; 210/257.2; 210/416.1
(58) Field of Search ................. 210/651, 650, 210/195.2, 416.1, 257.2, 636

(56) References Cited

U.S. PATENT DOCUMENTS

| | | | | |
|---|---|---|---|---|
| 4,111,812 A | * | 9/1978 | Baddour .................. | 210/257.2 |
| 4,426,293 A | * | 1/1984 | Mason et al. .............. | 210/636 |
| 4,846,976 A | * | 7/1989 | Ford ........................ | 210/636 |
| 4,865,742 A | * | 9/1989 | Falletti .................... | 210/637 |
| 4,886,603 A | * | 12/1989 | Taylor ..................... | 210/641 |
| 4,952,317 A | | 8/1990 | Culkin | |
| 5,209,838 A | * | 5/1993 | Sleppy et al. | |
| 5,248,424 A | * | 9/1993 | Cote et al. ............... | 210/636 |
| 5,352,363 A | * | 10/1994 | Shibano .................... | 210/651 |
| 6,146,535 A | * | 11/2000 | Sutherland ................ | 210/637 |
| 6,322,698 B1 | | 11/2001 | Rios et al. | |

FOREIGN PATENT DOCUMENTS

| | | |
|---|---|---|
| JP | 47-34503 | 11/1972 |
| JP | 52-42504 | 4/1977 |
| JP | 54-163904 | 12/1979 |
| JP | 61-151298 | 7/1986 |

* cited by examiner

*Primary Examiner*—Ana Fortuna
(74) *Attorney, Agent, or Firm*—Oblon, Spivak, McClelland, Maier & Neustadt, P.C.

(57) ABSTRACT

A crude oil processing method is provided wherein a membrane module is immersed in the crude oil contained in a processing tank and the crude oil is pressurized or driven by gravity for gravitational filtration, thereby to pass through the membrane, with the dehydrated oil that has passed being taken out through an oil collecting pipe. According to this method, a high degree of separation and removal of water content from the crude oil can be carried out regardless of the properties of the crude oil, and muddy matter can also be separated and removed.

29 Claims, 8 Drawing Sheets

DEVICE AND METHOD FOR PROCESSING CRUDE OIL

TECHNICAL FIELD

The present invention relates to a crude oil processing apparatus for separating water from crude oil, and a crude oil processing method.

This application is based on Japanese Patent Applications (Japanese Patent Application No. Hei 10-48303and Japanese Patent Application No. Hei 10-48306) filed in Japan, the contents of which are incorporated herein as a part of this specification.

BACKGROUND ART

Crude oil contains as principal components paraffin, naphthene, aromatic and other hydrocarbons. The physical and chemical properties of the crude oil are determined by the proportion of various chemical compounds contained therein, and the properties of the crude also vary significantly from oil field to oil field, and from horizon to horizon.

It is an internationally accepted practice to represent the specific gravity of crude oil with API (American Petroleum Institute) gravity. API gravity is determined as follows.

API gravity=(141.5/G)−131.5 where G is the ratio of the mass of crude oil at 60° F.(15.6° C.) to the mass of water of the same volume at 60° F. Various types of crude oil are roughly classified as follows in terms of API gravity.

| Bitumen API gravity: | Less than 10 |
| --- | --- |
| Heavy oil | From 10 or more to below 22.3 |
| Sub-heavy oil | 15 to 25 |
| Medium oil | 24–39 |
| Light oil | 39–45 |
| Ultra light oil | 45 or higher |

Crude oil is produced by, first, collecting the crude oil from various oil reservoirs in the ground through oil wells by flowing, pumping, water or gas injection, or other methods. The crude oil that has been collected is sent from a branch pipe, called the Christmas tree which is installed on the well head, through a pipeline embedded underground to an oil gathering station. The crude oil gathered at the oil gathering station is sent to a separator where gas and water are separated from the crude oil.

FIG. 8 shows an example of the separator. Separators are roughly classified into horizontal, vertical and spherical types. The example shown is of the horizontal type.

The separator 201 of the example comprises a closed tank that has a crude oil inlet 202 provided at a position a little above the center of the side wall on one end, a separated oil outlet 213 provided at a position a little below the center of the side wall on the other end, a separated water outlet 212 provided at the bottom on the other end, and a gas outlet 214 installed at the top. Provided in the separator 201 are a weir plate 203 installed near the crude oil inlet 202 to suppress billowing of the crude oil that has been introduced, and a partition wall 215 installed on the other end to allow only the supernatant (separated oil) of the liquid in the crude oil layer 204 to overflow into the separated oil layer 206 on the separated oil outlet 213 side.

To remove water from the crude oil using the separator 201 having such a constitution as described above, first, the crude oil sent from the production well is introduced rapidly through the crude oil inlet 202 into the separator 201. After billowing has been quelled near the crude oil inlet 202, the crude oil passes the weir plate 203 and into the crude oil layer 204 of the next section.

Gas that has escaped from the crude oil layer 204 is accumulated in a gas layer 205 located above in the separator 201, and is occasionally discharged through a gas outlet 214. The crude oil layer 204 separates over time into oil and water due to differences in specific gravity, and water is accumulated into a separate lower water layer 207. The crude oil is heated to a temperature in a range from 40 to 60° C., thereby decreasing the viscosity of the crude oil, to improve the efficiency of separation. Water in the separated water layer 207 is occasionally discharged through a separated water outlet 212 by opening and closing a water level control valve 210 under the control of a water level controller 208. The separated oil that is free of gas and water by separating from the crude oil layer 204 flows over the partition wall 215 into a separated oil layer 206. The separated oil in the separated oil layer 206 is occasionally discharged through a separated oil outlet 213 by opening and closing an oil level control valve 211 under the control of an oil level controller 209.

The method of separating water from the crude oil by making use of differences in specific gravity between oil and water using the separator 201 described above requires an increase in the scale of the facilities when the quantity of crude oil to be processed is increased, thus giving rise to such problems as the selection of site to build the facility, equipment investment cost for the facility and energy cost of the heating boiler. Moreover, such problems as the limitations to the processing rate and capacity and limitations to reduction of the water content make it difficult to increase the processing capacity by increasing the scale of the facility.

In the meantime, the separated oil from which gas and water are removed may still include a significant water content, with fine water particles and muddy matter uniformly dispersed therein depending on the nature of the crude oil. Such a dispersed state is called an emulsion. Such fine water particles would not be caused to aggregate into separable water simply by leaving the oil to stand still. This is because the surface tension of the fine water particles is strong and hinders the water particles from combining.

Also the muddy matter can corrode the processing facility after separation. The muddy matter may also have a composition that is not suited to refining and production, in which case that production yield may become lower.

Thus in order to decrease the water content in the separated oil, processes such as the following are employed: (1) to destroy the adsorption membrane of the water particles by using a surfactant thereby to cause the water particles in the emulsion to aggregate into separable water; and (2) to apply a high AC voltage of 10 kV to 20 kV to make an AC current flow through the emulsion thereby to reorient the adsorption membrane of the water particles under the effect of the electric field into such a state that the water particles collide with each other more frequently and also attract each other, thereby causing the water particles in the state of emulsion to aggregate into separable water.

However, the process (1) of adding the surfactant requires the choice of the surfactant best suited for the oil temperature, oil processing rate, components of the oil and the concentration of salt content in the oil, and makes it necessary to determine the surfactant adding condition. Also there has been the problem that the surfactant is subject to a strong limitation due to the concentration of salt content in the oil or water, and therefore the conditions of use must be studied and determined according to which location and horizon of the oil field the crude oil comes from.

Also the process (2) of applying a high AC voltage has the problems of the site to build the facility, equipment investment and cost of the facility, the possibility of fire caused by the high voltage, fire prevention measures and the method of supplying electric power.

Among the different types of crude oil described previously, bitumen and heavy oil have particularly high values of specific gravity, close to that of water, and therefore take a longer time to separate from water.

DISCLOSURE OF THE INVENTION

The first embodiment of the present invention provides a crude oil processing apparatus for separating and removing water contained in crude oil, comprising a processing tank having a water drainage port at the bottom, a membrane that selectively allows the oil content of the crude oil to pass therethrough installed in the processing tank, a means which pressurizes the crude oil and a removal pipe for removing dehydrated oil that has passed the membrane.

The first embodiment of the present invention also provides a crude oil processing method, which comprises immersing a membrane module in crude oil contained in a processing tank, pressurizing the crude oil to pass through the membrane, and removing the dehydrated oil that has passed therethrough through an oil collecting pipe.

According to the first embodiment, a high degree of separation and removal of water from the crude oil can be accomplished regardless of the properties of the crude oil, and muddy matter can also be separated and removed. As a result, dehydrated oil having a lower water content and no muddy matter contained therein can be obtained without using a surfactant or applying a high voltage. Pressurizing the crude oil against the membrane also makes it possible to process the crude oil efficiently without waiting for the water content to precipitate due to the difference in the specific gravity as in the prior art. Consequently, it is possible to process a large quantity of crude oil in a small apparatus.

The second embodiment of the present invention provides a crude oil processing apparatus for separating and removing water contained in crude oil, comprising a processing tank having a water drainage port at the bottom, a membrane that selectively allows the oil content of the crude oil to pass therethrough installed in the processing tank, and a removal pipe one end of which communicates with a passage of dehydrated oil that has passed the membrane and opens on the other end thereof at a position lower than the crude oil surface in the processing tank.

The second embodiment of the present invention also provides a crude oil processing method, which comprises immersing a membrane module in crude oil contained in a processing tank, conducting gravitational filtration to make the crude oil pass through said membrane, and removing the dehydrated oil obtained in the gravitational filtration through an oil collecting pipe.

According to the second embodiment, since a level difference is provided between the surface of the crude oil in the processing tank and the position where the dehydrated oil removal pipe opens, thereby to carry out gravitational filtration of the crude oil through the membrane by the use of a pressure difference due to gravitational force, the oil-water separation process of the crude oil by means of the membrane can be accomplished without applying a driving force from the outside to the membrane. Thus, a high degree of separation and removal of water from the crude oil can be accomplished regardless of the properties of the crude oil, and muddy matter can also be separated and removed. As a result, dehydrated oil having a lower water content and no muddy matter contained therein can be obtained without using the surfactant or applying a high voltage.

BEST MODE FOR CARRYING OUT THE INVENTION

The crude oil processing apparatus of the present invention comprises a membrane that selectively allows the oil content of the crude oil to pass therethrough and is installed in the processing tank which has a water drainage port at the bottom thereof, and means which pressurizes the crude oil or a removal pipe one end of which communicates with the passage of dehydrated oil that has passed the membrane and opens on the other end thereof at a position lower than the crude oil surface in the processing tank.

When a hydrophobic membrane is used for the membrane described above, the oil content in the crude oil that is hydrophobic can easily pass through the membrane while the water content in the crude oil is repelled on the membrane surface, thereby making it possible to separate oil and water of the crude oil efficiently.

When a hollow fiber membrane is used for the membrane, a large surface area per unit volume that is effective in filtering the crude oil is provided resulting in higher processing efficiency. Use of a flat membrane makes it easier to clean the membrane surface and is convenient for volume production of the module.

When a hollow fiber membrane module, made by arranging a plurality of hollow fiber membranes substantially in parallel to each other and securing an oil collecting pipe in a liquid-tight condition to at least one end of the hollow fiber membrane to communicate with the inside of the hollow fiber membrane, is used for the membrane, handling of the hollow fiber membrane becomes easier.

It is preferable to provide means which heats and keeps the inside of the processing tank at a raised temperature, as this decreases the viscosity of the crude oil in the processing tank thereby improving the efficiency of separation by the membrane and accelerates the destruction of the water emulsion and separation of water from the crude oil with the help of heat.

If the membrane is installed movably in the processing tank and a driving means which moves the membrane is provided, this achieves the advantages that the efficiency of separation on the membrane surface is improved further by driving the membrane to move during the filtration process, and the loading of pores in the membrane can be mitigated.

If a bubble stream generator is installed below the membrane in the processing tank, a rotary stream can be generated that flows downwards near the membrane surface. This further improves the efficiency of separation on the membrane surface regardless of the nature of the crude oil and mitigates the loading of the pores in the membrane.

Now the present invention will be described in detail below with reference to the accompanying drawings.

Figure 1:
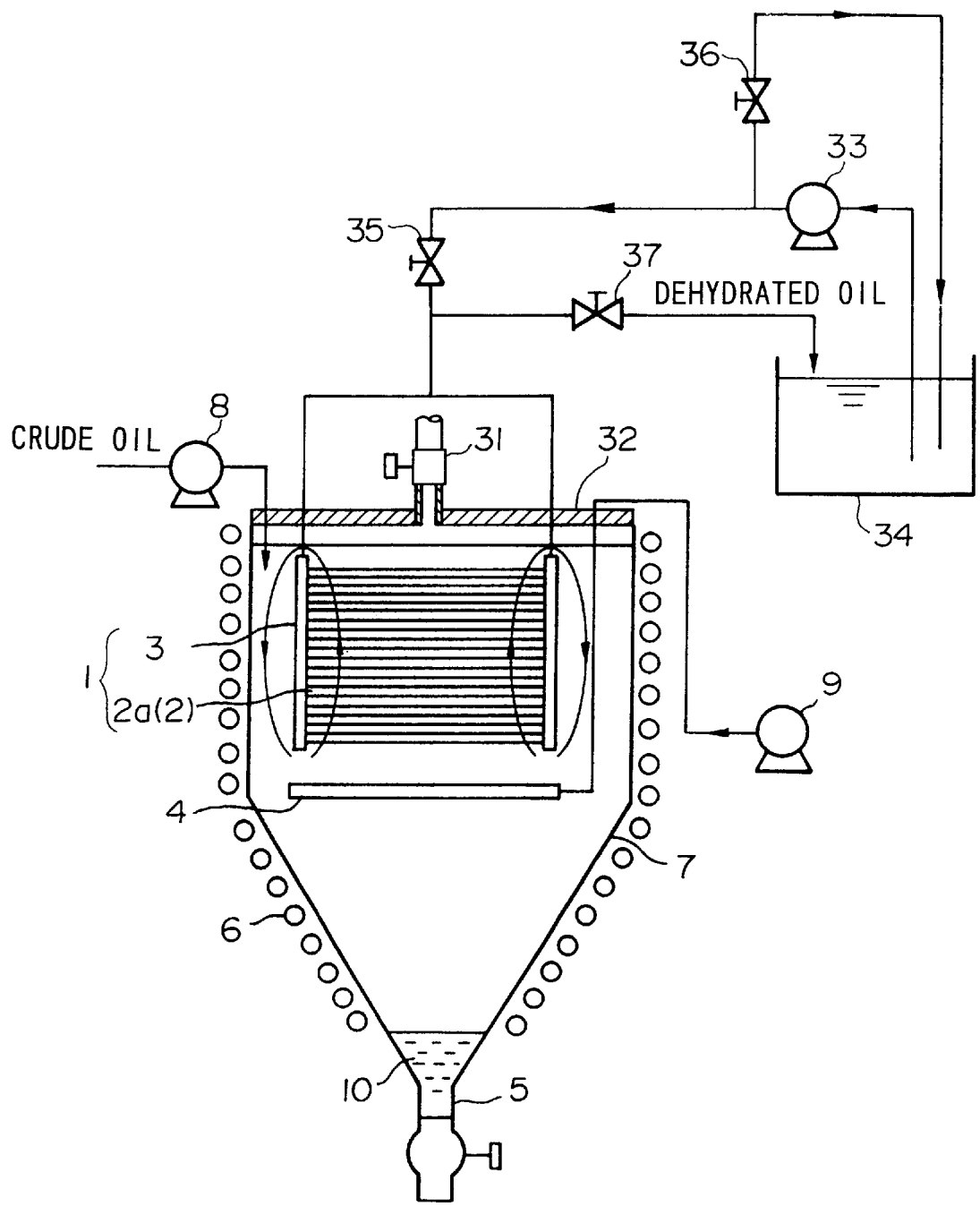
FIG. 1 is a schematic constitution diagram showing the first embodiment of the crude oil processing apparatus according to the present invention.

FIG. 1 shows an example of the first embodiment of the crude oil processing apparatus according to the present invention.

The crude oil processing apparatus shown in FIG. 1 is constituted mainly of a processing tank 7 having a water drainage port 5 provided at the bottom thereof, a hollow fiber membrane module 1 disposed in the processing tank 7, a pump 8 that supplies crude oil into the processing tank 7, a bubble stream generator 4 installed below the hollow fiber membrane module 1 in the processing tank 7, a blower 9 connected to the bubble stream generator 4, and a heating device 6 installed outside the processing tank 7. The processing tank 7 has a lid 32 that is provided with an exhaust valve 31, so that the processing tank 7 can be freely closed and opened with respect to the atmosphere by operating the exhaust valve 31.

Figure 2:
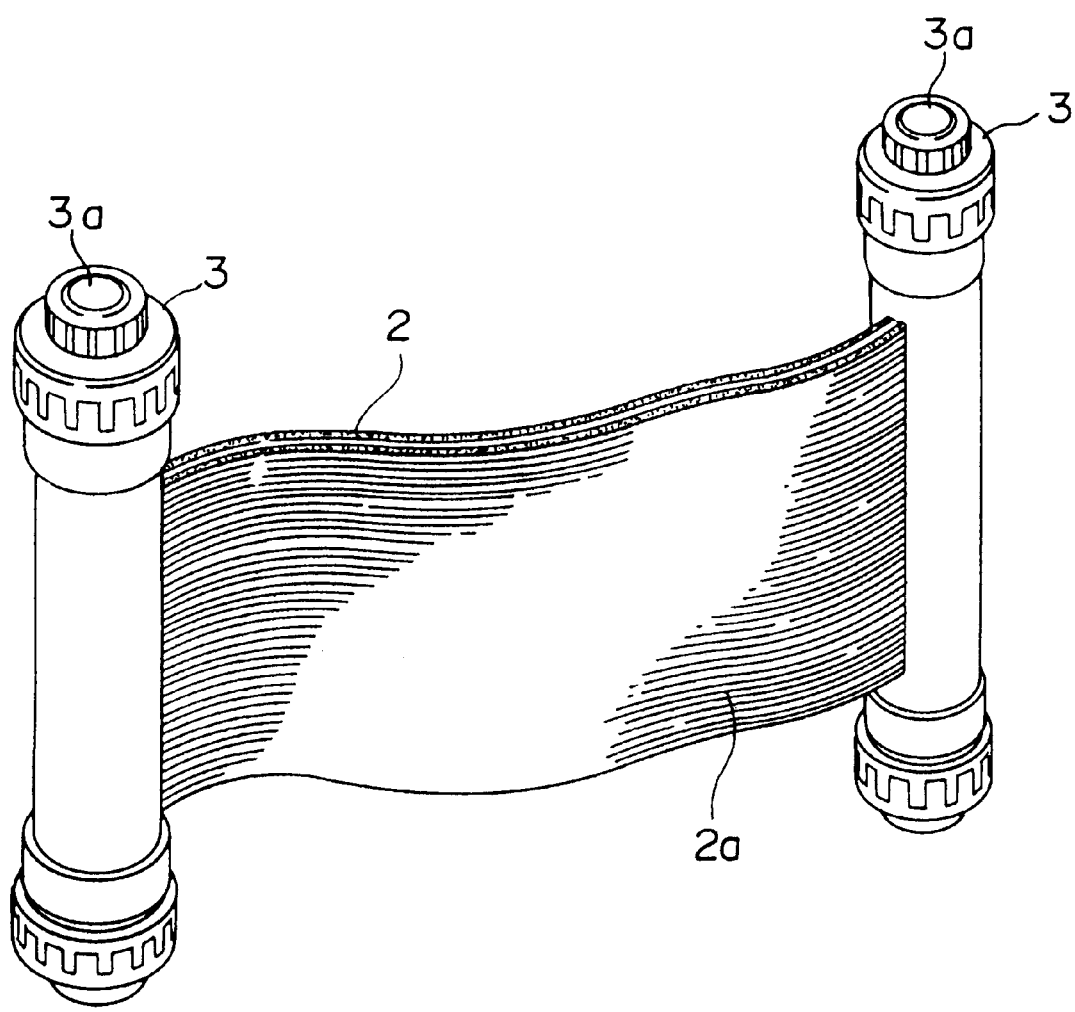
FIG. 2 is a perspective view of a hollow fiber membrane module used in the apparatus shown in FIG. 1

The hollow fiber membrane module 1 comprises a screen section 2a made by arranging a plurality of hollow fiber membranes 2 substantially in parallel to each other and oil collecting pipes 3, 3 secured at both ends thereof as shown in FIG. 2.

The hollow fiber membrane 2 consists of porous fibers that are hollow inside, and preferably having hydrophobicity on the surface thereof. For example, a hollow fiber membrane made of a hydrophobic polymer or a hollow fiber membrane made of a hydrophilic polymer that is treated to have hydrophobicity on the surface may be preferably used.

When the surface of the hollow fiber membrane 2 has hydrophobicity, the oil content in the crude oil that is hydrophobic can easily pass through the membrane while water content in the crude oil is repelled on the membrane surface, thereby separating oil and water of the crude oil efficiently.

The hollow fiber membrane 2 maybe made of such materials as polyethylene, polypropylene, polysulfone, polyethylene tetrafluoride (Teflon), polycarbonate, polyester, cellulose, polyamide, aromatic polyamide, polyimide, polyacrylonitrile, polymethylmethacrylic, polyvinyl alcohol, ethylene-vinyl alcohol copolymer and polyether.

The surface of the hollow fiber membrane 2 preferably has water repellency since this further reduces the water content in the oil that has passed the hollow fiber membrane 2 (referred to as "dehydrated oil" in this specification) The surface of the hollow fiber membrane 2 can be rendered water repellent by, for example, coating the surface with a fluorocarbon resin.

In case heavy oil or bitumen is used as the crude oil, it is necessary to set the processing apparatus temperature higher because of the high viscosity and larger specific gravity, and therefore a hollow fiber membrane having heat resistance is desirably used. For the hollow fiber membrane described above, a hollow fiber membrane made of a Teflon-based material is used.

The hollow fiber membrane 2 preferably has an outer diameter of 2000 $\mu$m or less, inner diameter of 1800 $\mu$m or less and a film thickness of 200 $\mu$m or less, or more preferably an outer diameter of 600 $\mu$m or less, an inner diameter of 400 $\mu$m or less and a film thickness of 100 $\mu$m or less.

The water content in the dehydrated oil can be controlled by selecting a proper pore diameter of the hollow fiber membrane 2 that is a porous membrane, with a smaller pore diameter leading to a lower water content in the dehydrated oil. It is generally said that the water content in the dehydrated oil is preferably 2.0% or lower. When the pore diameter of the hollow fiber membrane 2 is 1.0 $\mu$m or smaller, not only the water content in the crude oil but also a water emulsion can be separated and removed and water content in the dehydrated oil as measured by the Carl-Fischer method can be made 2.0% or lower, but more preferably the pore diameter of the hollow fiber membrane 2 is 0.2 $\mu$m or smaller. The void ratio of the hollow fiber membrane 2 is preferably in a range from 20 to 90%.

The longer the hollow fiber membranes 2 that constitute the hollow fiber membrane module 1, the larger the area of the screen section 2a can be made. However, since hollow fiber membranes 2 which are too long will increase the resistance in the hollow fiber membrane tube, leading to a lower processing efficiency, the length of the hollow fiber membrane is preferably set within a range from 100 mm to 2000 mm depending on the properties of the crude oil to be processed, the processing capacity and other factors.

The number of the hollow fiber membranes 2 that constitute the hollow fiber membrane module 1 is determined according to the properties of the crude oil to be processed and the required processing capacity, since the processing capacity of the apparatus varies depending on the area of the screen section 2a and on the total surface area of the hollow fiber membranes 2.

The oil collecting pipes 3, 3 are pipes in which the dehydrated oil flows through, and have dehydrated oil removal ports 3a at the ends thereof. The oil collecting pipes 3, 3 are preferably made of a material that is high in mechanical strength and in durability, and has resistance to corrosion by dehydrated oil. The material may be a metal such as stainless steel or a plastic material such as polyethylene resin, polypropylene resin, polyethylene tetrafluoride (Teflon), polymethylpentene resin, polyacetal resin, polyvinyl chloride resin, polyamide resin, PBT resin and PPS resin.

In case heavy oil or bitumen is used as the crude oil, it is necessary to set the processing apparatus temperature higher because of the high viscosity and larger specific gravity, and therefore a hollow fiber membrane having heat resistance is desirably used. Particularly, stainless steel, Teflon resin, PPS resin or the like are preferably used.

Although the oil collecting pipes 3, 3 have a circular cross section in this embodiment, the oil collecting pipes are not limited to this configuration and may be tubular bodies of any proper configuration.

A multitude of hollow fiber membranes 2 are disposed in the shape of screen with both ends thereof inserted into slits (not shown) that are formed in the circumference of the oil collecting pipes 3, 3 with a fastening member filling the slits, so that the hollow fiber membranes 2 and the oil collecting pipes 3, 3 are fastened to each other in a liquid-tight condition. Under this condition, the inside of the oil collecting pipes 3, 3 communicates with the inside of the hollow fiber membranes 2. The fastening member secures the ends of the multitude of hollow fiber membranes 2, with the ends thereof being kept open, onto the oil collecting pipes 3, and may be made by hardening a liquid resin such as epoxy resin, unsaturated epoxy resin, polyurethane resin and silicone resin or melting a polyolefin resin such as polyethylene resin or polypropylene resin and cooling to solidify.

In case heavy oil or bitumen is used as the crude oil, it is necessary to set the processing apparatus temperature higher because of the high viscosity and larger specific gravity, and is therefore the fastening member having heat resistance is desirably used. In particular, epoxy resin or silicone resin is preferably used.

The hollow fiber membrane 2 may be secured only on one end thereof, instead of both ends. In case the hollow fiber membrane 2 is secured only on one end thereof onto the oil collecting pipe 3, it is necessary to seal off the other end which is not fastened onto the oil collecting pipe 3 so that unprocessed crude oil does not flow in through the open end of the hollow fiber membrane 2. Or, alternatively, the hollow fiber membrane 2 may also be made in U-shape and fastened on only one end thereof.

The hollow fiber membrane module 1 is preferably installed in the processing tank 7 to be freely attachable and detachable, in such a manner as to be suspended from the above, or being supported while floating in the processing tank 7 with a float being attached to the hollow fiber membrane module 1. It is convenient to use a coupler for making the hollow fiber membrane module 1 freely attachable and detachable. When the hollow fiber membrane module 1 is made freely attachable and detachable, the hollow fiber membrane module 1 can be easily changed and maintenance service can be made very simple.

Although the hollow fiber membrane module 1 is disposed in the processing tank 7 so that the direction parallel to the surface of the screen section 2a and the longitudinal direction of the oil collecting pipe 3 are vertical (perpendicular to the liquid surface) in this embodiment, the present invention is not limited to this configuration and the hollow fiber membrane module 1 may also be disposed in a vertical, horizontal or inclined orientation in accordance to the property of the crude oil to be processed, the flow direction of the crude oil in the processing tank 7, the required processing rate and the flow rate, and the structure of the processing tank 7.

The number of the hollow fiber membrane modules 1 installed in the processing tank 7 is not necessarily one and, when a plurality of hollow fiber membrane modules 1 are installed in the desired directions, the total surface area of the membranes can be increased thereby achieving a greater processing capability. For example, a plurality of hollow fiber membrane modules 1 may be stacked. In this case, the plurality of hollow fiber membrane modules 1 are preferably housed in a frame to make a unit, since this makes it easier to install and remove the hollow fiber membrane modules in and from the processing tank 7. Making the unit by using couplers particularly improves the ease of handling and makes maintenance and changing operations easier.

Figure 3:
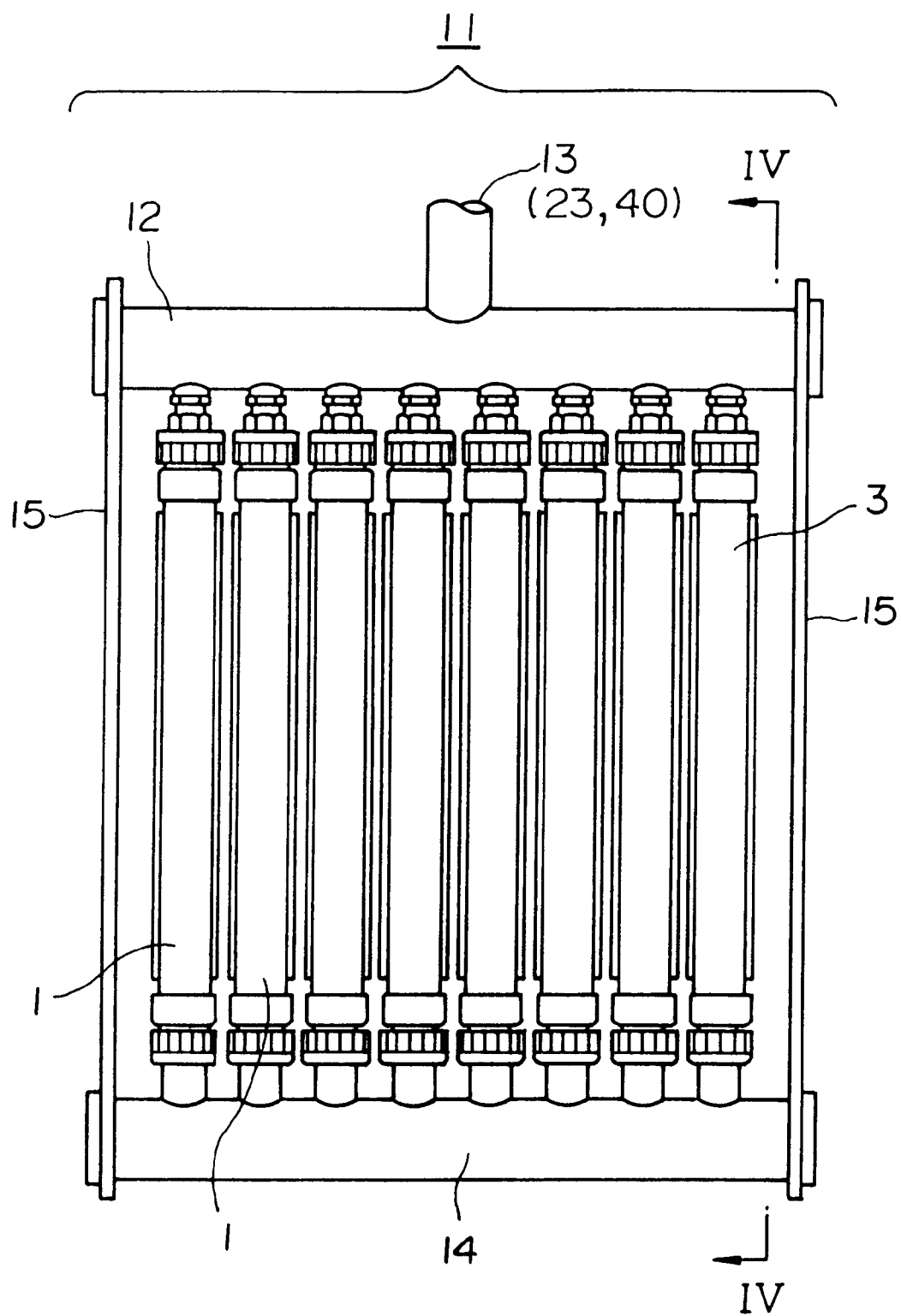
FIG. 3 is a front view showing an example of hollow fiber membrane unit.
Figure 4:
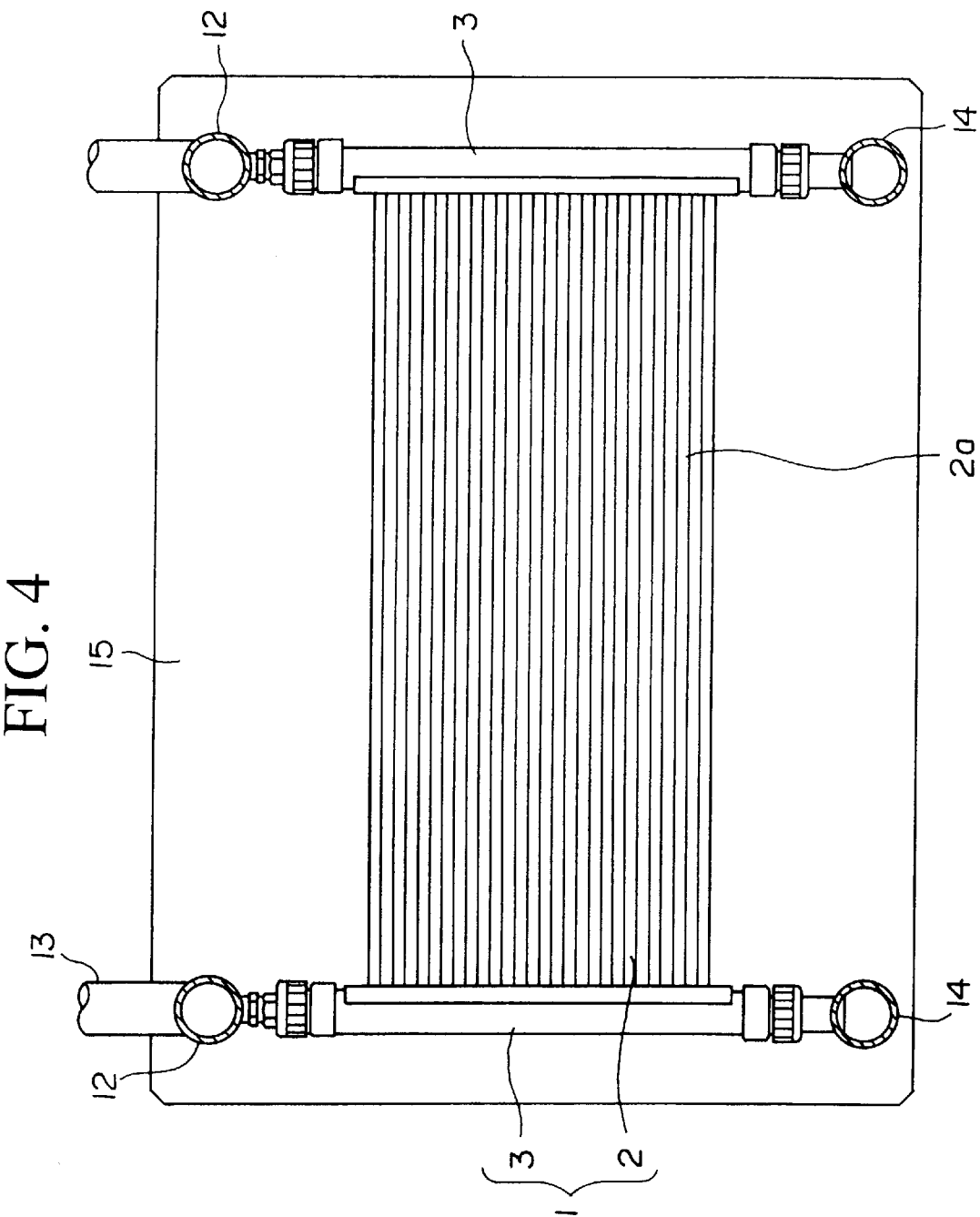
FIG. 4 is a sectional view of the hollow fiber membrane unit shown in FIG. 3.

FIG. 3 and FIG. 4 show an example of a hollow fiber membrane unit 11 comprising eight hollow fiber membrane modules 1 combined into a unit, FIG. 3 being a front view thereof and FIG. 4 being a sectional view taken along the line IV—IV of FIG. 3. In these drawings, members having identical counterparts shown in FIG. 1 are identified with the same reference symbols as those of FIG. 1. The hollow fiber membrane unit 11 is constituted mainly from a box-shaped frame wherein two major oil collecting pipes 12, 12 that are parallel to each other and two support pipes 14, 14 are secured on both ends thereof at four corners of two side plates 15, 15 disposed in parallel to each other, while eight hollow fiber membrane modules 1, 1, . . . , are mounted, preferably detachably, on the frame.

The eight hollow fiber membrane modules 1, 1, . . . , are disposed so that the oil collecting pipes 3, 3, . . . , and the screen surfaces 2a, 2a, . . . , are in parallel to each other, while the upper ends of the eight oil collecting pipes 3, 3, . . . , on one end side are connected to the major oil collecting pipe 12 on one side and the upper ends of the eight oil collecting pipes on the other end are connected to the major oil collecting pipe 12 on the other side. In this configuration, the major oil collecting pipes 12 and the oil collecting pipes 3 communicate with each other. The lower ends of the oil collecting pipes 3 are fastened onto the support pipe 14 installed in parallel to the major oil collecting pipe 12. The lower ends of the oil collecting pipes 3 may be sealed off with only insertion holes being formed in the support pipe 14 while the lower ends of the oil collecting pipes 3 are inserted in the holes so that the support pipe 14 serves as a guide. Or, alternatively, the support pipes may also be used as the major oil collecting pipes with the major oil collecting pipes communicating on both ends of the oil collecting pipes 3. The major oil collecting pipes 12 are each provided with a dehydrated oil removal pipe 13.

When the hollow fiber membrane unit 11 having such a constitution as described above is used, the dehydrated oil that has passed the hollow fiber membrane 2 is sent through the oil collecting pipes 3, the major oil collecting pipes 12 and the dehydrated oil removal pipe 13, thereby to be removed from the processing tank 7.

In this embodiment, the dehydrated oil that has passed the hollow fiber membrane 2 passes through a dehydrated oil valve 37 and is stored in a dehydrated oil tank 34. The apparatus can also have a constitution in which the dehydrated oil stored in the dehydrated oil tank 34 can be pumped up by a backwash pump 33 and pressured to flow in the reverse direction through a backwash valve 35 to the hollow fiber membrane 2, thus making it possible to back-wash the hollow fiber membranes 2 as required. The flow rate of the dehydrated oil during backwash can be regulated by means of a backwash control valve 36.

A pump 8 is provided to supply the crude oil into the processing tank 7, and is capable of pressurizing the crude oil supplied from the processing tank 7 to press against the hollow fiber membranes 2 by supplying the crude oil while keeping the processing tank 7 in a closed state. A difference in pressure across the hollow fiber membrane 2, namely the difference between the pressure at the crude oil side and the pressure at the dehydrated oil side of the hollow fiber membrane 2, is controlled so as to maintain a predetermined value. This causes the crude oil supplied from the processing tank 7 to be filtered by the hollow fiber membrane 2 at a constant pressure, and the dehydrated oil that has passed the hollow fiber membrane 2 is sent through the inside of the oil collecting pipe 3 and discharged to the outside of the processing tank 7. The preferable pressure difference across the hollow fiber membrane 2 varies depending on the pore diameter of the hollow fiber membrane 2, but is preferably set in a range from 0.003 to 0.25 MPa.

A pump having an explosion-proof construction is used for the pump 8, that may be a reciprocating pump (fixed displacement pump) or a rotary pump. Reciprocating pumps include piston pumps, diaphragm pumps, wing pumps, etc., and rotary pumps include geared pumps, eccentric rotor pumps, screw pumps, etc. The pump may be have a known construction as metallic pump, a pump with lining, a pump made of resin or pump made of ceramics. As these pumps are different in operating principles, structures and characteristics, a proper type is preferably selected according to the property and quantity of the crude oil to be processed.

Pressurizing means other than a pump may also be used as long as the crude oil supplied from the processing tank 7 can be pressed against the hollow fiber membrane 2. For example, a configuration in which a level difference is provided between the liquid surface in the processing tank 7 and the liquid surface in the crude oil tank (not shown) where the crude oil is stored before being supplied to the processing tank 7, thereby to pressurize the crude oil with the potential difference between the tanks, or a configuration in which the crude oil is pressurized by making use of the siphon principle, may be employed.

Use of a pump as the pressurizing means has the advantage of reducing the size of the processing apparatus, and the use of a water level difference or the siphon principle has the advantage of not requiring electric power, thus resulting in a lower running cost.

The bubble stream generator 4 is provided for the purpose of bubbling a gas below the hollow fiber membrane module 1, and is connected to a blower 9 that supplies the gas. Bubbles are generated and move in all directions in the bubble stream generator 4, thereby generating a rotary stream in the crude oil contained in the processing tank 7 to flow upwards along the surface of the screen section 2a and downwards between the hollow fiber membrane module 1 and the inner wall of the processing tank 7 as indicated by the arrow in FIG. 1, The exhaust valve 31 is preferably opened at this time.

In the crude oil processing apparatus of this embodiment, surface of the hollow fiber membrane 2 can be washed to eliminate loading of the pores in the membrane by carrying out pressurization intermittently and carrying out a bubbling operation by the bubble stream generator 4 while the pressurization is stopped.

In order to efficiently wash the membrane surface by bubbling, it is preferable to design the apparatus so that sufficient space is secured in all directions around the hollow fiber membrane module 1 for a downward stream to form, with an upward stream being surely formed near the screen 2a. Also a baffle plate may be installed, although not shown, near the bubble stream generator 4 and the hollow fiber membrane module 1, so that the bubbles generated by the bubble stream generator 4 do not escape to the outside, namely into the space between the hollow fiber membrane module 1 and the inner wall of the processing tank 7.

The bubble stream generator 4 is preferably designed by properly selecting the positions of the holes from which bubbles are released, the diameter of the holes, the relative positions of the bubble stream generator 4 and the hollow fiber membrane module 1 and the quantity of bubbles to be generated, in accordance to the crude oil to be processed, so that the bubbles uniformly make efficiently contact with the surface of the screen section 2a of the hollow fiber membrane module 1.

A gas that has no significant effect on the crude oil to be processed is preferably used in generating the bubbles and, for example, air, carbon dioxide gas, nitrogen gas, liquefied petroleum gas (LPG) and the like may be used.

It is also preferable to move the hollow fiber membrane module 1 in the processing tank 7, thereby causing a stream in the oil while under pressurization, which is effective in improving the efficiency of separating and removing water at the surface of the hollow fiber membrane 2 and, at the same time, mitigating the loading of the pores in the hollow fiber membrane 2. When cleaning the membrane surface without applying pressure, too, it is more preferable to move the hollow fiber membrane module 1 while bubbling at the same time.

For example, a proper driving means may be installed and the hollow fiber membrane module 1 may be installed movably in the processing tank 7 so that the hollow fiber membrane module 1 can be moved or rotated in a proper direction. Also, such a driving means as an eccentric cam, an ultrasonic oscillator or a vibrator may be provided to oscillate or vibrate the hollow fiber membrane module 1.

A heating device 6 is installed outside the processing tank 7 for heating or keeping the crude oil in the processing tank 7 at a raised temperature. Since heating the crude oil in the processing tank 7 to a proper temperature decreases the viscosity of the crude oil, the efficiency of separation by the hollow fiber membrane module 1 is improved and the destruction of the water emulsion is accelerated and the separation of water from the crude oil is promoted with the help of heat, regardless of the nature of the crude oil. Examples of a preferable heating device are a steam pipeline, oil jacket, warm water circulator and electric heater. Since heating the crude oil to too high a temperature leads to the generation of much vapor (gas), while the viscosity of the crude oil becomes high and the efficiency of separation decreases when the temperature is too low, the crude oil is preferably heated to a temperature in a range from 30 to 80° C., more preferably 40 to 60° C. If heavy oil or bitumen is used for the crude oil, it is necessary to set the processing apparatus temperature higher than that of normal operation because of their higher viscosity and larger specific gravity even when processed similarly, and the temperature may be set higher than 80° C. in some cases.

To separate water from the crude oil using such a crude oil processing apparatus, first the processing tank 7 is put in a closed state and the pump 8 is started to supply the crude oil into the processing tank 7. The hollow fiber membrane module 1 is immersed in the crude oil. The pump 8 is controlled to maintain a predetermined pressure difference across the membrane. It is also preferable to heat and keep the crude oil in the processing tank 7 at a proper temperature with the heating device 6.

By the operation described above, the oil content (dehydrated oil) that can pass through the hollow fiber membrane 2 is sent through the hollow fiber membrane 2 and the oil collecting pipe 3 and is removed from of the processing tank 7. The water contained in the crude oil cannot pass through the hollow fiber membrane 2, and precipitates over time due to the difference in specific gravity, thereby forming a separated water layer 10 at the bottom of the processing tank 7. The separated water may be drained occasionally from the water drainage port 5. Muddy matter included in the crude oil also cannot pass through the hollow fiber membrane 2, and settles due to gravity, and can be discharged together with the water from the separated water layer 10 through the water drainage port 5. While natural gas dissolved in the crude oil passes through the hollow fiber membrane 2 and is taken out together with the dehydrated oil, the natural gas may also be supplied to the bubble stream generator 4 and reused as bubbling gas, which is advantageous for decreasing the running cost.

Pressurization by the pump 8 is preferably carried out intermittently, for example, repeating a cycle of pressurizing for 10 to 60 minutes followed by a period of 1 to 10 minutes without pressurization. When the pressure is not applied, it is preferable to open the valve 31 installed in the lid 32 of the processing tank 7 and to supply the gas from the blower 9 to the bubble stream generator 4, thereby carrying out bubbling below the hollow fiber membrane module 1 to wash the surface of the hollow fiber membrane 2.

When the pressure is not applied, the hollow fiber membrane 2 may also be back-washed by pressurizing the dehydrated oil in the reverse direction to the hollow fiber membrane 2, while opening the processing tank 7. It is more preferable to carry out bubbling and backwashing at the same time. Backwashing may be done by installing proper pressurizing means in the path through which the processed oil is discharged from the hollow fiber membrane module 1 to the outside of the processing tank 7, thereby to send back the processed oil through the hollow fiber membrane 2 into the processing tank under pressure. Alternatively, air, carbon dioxide, LNG or the like may also be sent under pressure, instead of flowing the dehydrated oil in the reverse direction.

By cleaning the surface of the hollow fiber membrane 2 intermittently as described above, it is possible to carry out the oil-water separation process in a satisfactory way regardless of the property of the crude oil, including crude oils that are very difficult to filer by ordinary filtering methods. If the crude oil is pressurized intermittently and the hollow fiber membrane is washed during intervals when the pressure is not applied, muddy matter that has been filtered out and accumulated on the membrane surface around the pores during the pressured operation can be removed, thus allowing stable operation for a long period of time.

According to the crude oil processing method that uses the crude oil processing apparatus of this embodiment described above, since high a degree of separation and removal of water from the crude oil can be accomplished regardless of the properties of the crude oil, and muddy matter can also be separated and removed. Dehydrated oil having lower water content and no muddy matter contained therein can be obtained. Also because forced filtration of the crude oil is carried out by pressurizing the crude oil against the hollow fiber membrane 2, it is possible to process the crude oil efficiently without waiting for the water content to precipitate due to a difference in specific gravity as in the prior art. Consequently, it is possible to process a large quantity of crude oil in a small apparatus.

The hollow fiber membrane module 1 used in this embodiment has membrane surface formed in the shape of a screen constituted from a plurality of hollow fiber membranes 2 by taking advantage of the characteristic properties of the tough and flexible hollow fiber membrane 2. As a result, the hollow fiber membrane module 1 provides a large effective contact area between the crude oil and the hollow fiber membranes 2 resulting in high processing efficiency. Also because the hollow fiber membranes 2 are not in close contact with each other, clogging between the membranes by deposits generated during processing of the crude oil is mitigated. Also the modular construction of the plurality of hollow fiber membranes 2 makes it easier to handle the hollow fiber membranes 2.

The hollow fiber membrane module 1 is characterized by the hydrophobic nature of the hollow fiber membranes 2, 3-phase state of the fluid (crude oil) to be processed including oil, water and gas, and the capability to carry out liquid-liquid separation by passing hydrocarbons included in the crude oil while inhibiting water content and muddy matter from passing, thereby to separate these materials. Specifically, the oil content in the crude oil can easily pass through the hollow fiber membrane 2 because of the hydrophobic nature, while the water content in the crude oil is repelled from the membrane surface, thus separating the oil and water from the crude oil efficiently. Since the hollow fiber membrane 2 that has hydrophobicity allows the gas that is dissolved in the crude oil to pass therethrough, the gas does not build up in the closed processing tank, thereby providing the advantage that a degassing operation is unnecessary during the filtration process.

Moreover, since the hollow fiber membrane 2 can be made to have inner and outer diameters that are more uniform than other hollow membranes, and the membrane can be made with small and constant thickness, the hollow fiber membrane 2 allows highly stable transmission of the oil content while reducing the pressure loss and concentration polarization.

Now the second embodiment of the crude oil processing apparatus according to the present invention that utilizes gravitational filtration will be described below with reference to FIG. 5 through FIG. 7.

Figure 5:
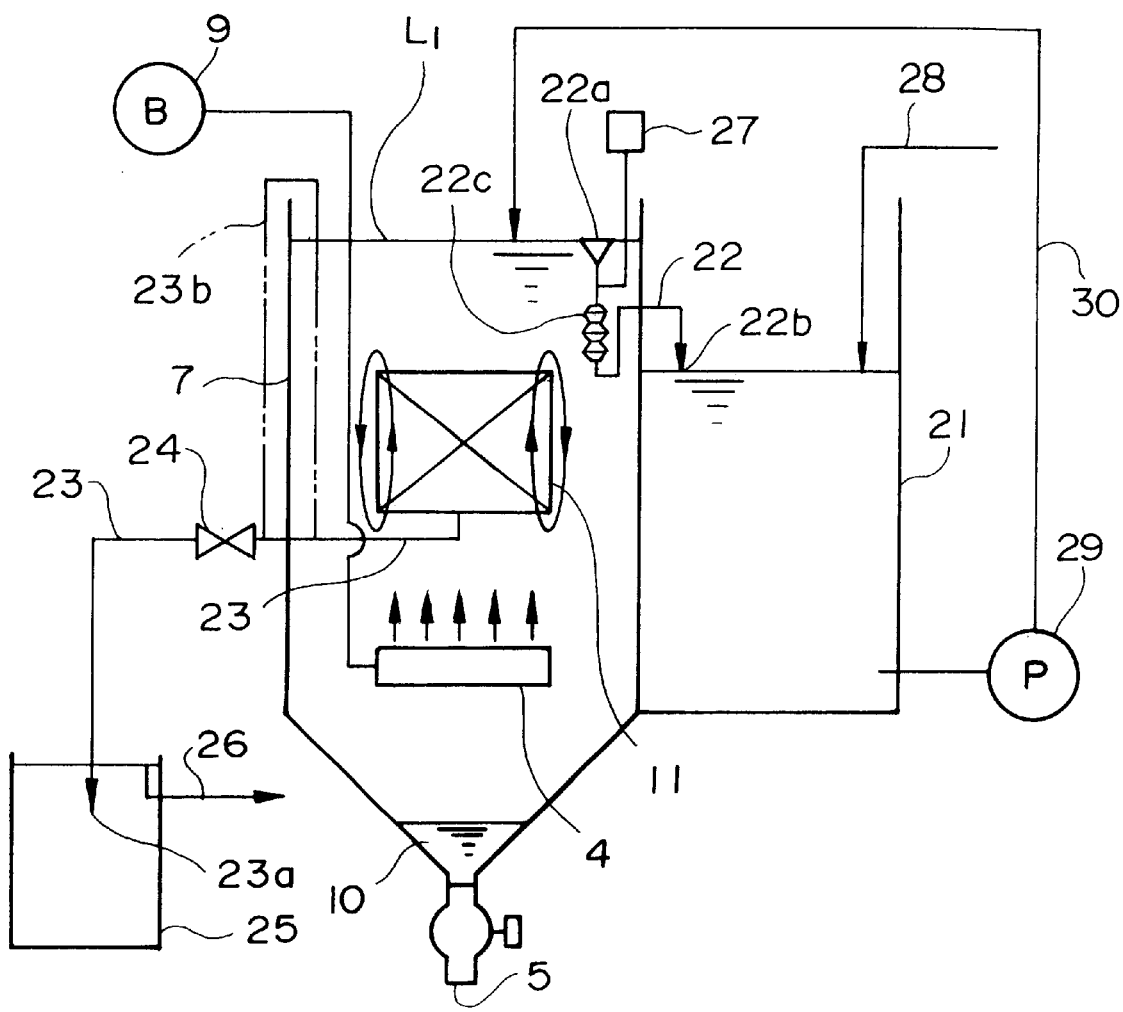
FIG. 5 is a schematic constitution diagram showing the second embodiment of the crude oil processing apparatus according to the present invention.

FIG. 5 shows the second embodiment of the crude oil processing apparatus according to the present invention. In this drawing, components identical with those shown in FIGS. 1 through 4 will be identified with the same reference symbols and the description thereof will be omitted.

In this embodiment, the processing tank 7 has a water drainage port 5 provided in the bottom, and stores crude oil therein with a hollow fiber membrane unit 11 being immersed in the crude oil. The hollow fiber membrane unit 11 consists of a plurality of hollow fiber membrane module 1 combined into a unit. The hollow fiber membrane unit 11 has a removal pipe 23 connected thereto for removing the dehydrated oil that has passed the hollow fiber membrane module 1 to the outside of the processing tank 7.

The removal pipe 23 communicates on one end thereof with the dehydrated oil passage of the hollow fiber membrane unit 11 and communicates on the other end with the outside of the processing tank 7 via a flow control valve 24 with the distal end 23a thereof opening at a position below the liquid surface $L_1$ of the crude oil in the processing tank 7. The distal end 23a of the removal pipe 23 is located in the dehydrated oil tank 25, and an overflow pipe 26 is installed in the dehydrated oil tank 25 to maintain the liquid level therein constant.

The removal pipe 23 may also be constituted from a siphon tube of which an intermediate portion is located above the liquid surface $L_1$ of the crude oil in the processing tank 7 as indicated by the broken line (reference symbol 23b) in FIG. 5.

The bubble stream generator 4 is installed below the hollow fiber membrane unit 11 in the processing tank 7, and the blower 9 is connected to the bubble stream generator 4.

A crude oil tank 21 is installed adjacent to the processing tank 7, the two tanks communicating with each other via an overflow pipe 22. A liquid inlet 22a of the overflow pipe 22 opens at a position higher than the hollow fiber membrane unit 11 in the processing tank 7, and an outlet 22b thereof opens in the crude oil tank 21. The overflow pipe 22 also has a bellows section 22c that expands and contracts vertically that is formed in an intermediate portion thereof, and a cylinder device 27 for moving the liquid inlet 22a vertically.

The crude oil tank 21 has a crude oil supply pipe 28 that supplies the crude oil thereto. Opening at the bottom of the crude oil tank 21 is the base end of a circulation pipe 30 that includes a circulation pump 29 installed therein, with the distal end of the circulation pipe 30 opening in the processing tank 7.

The crude oil tank 21 and the processing tank 7 do not need to be installed adjacent to each other, and need only to communicate with each other via the overflow pipe 22.

The hollow fiber membrane unit 11 has a constitution similar to that shown in FIG. 3 and FIG. 4. The hollow fiber membrane modules 1 that constitute the hollow fiber membrane unit 11 also have a constitution similar to that shown in FIG. 2, and the dehydrated oil removal pipe 23 is connected to communicate with the major oil collecting pipe 12.

Each of the hollow fiber membrane modules 1 is preferably mounted on the major oil collecting pipe 12 and the support pipe 14 to be freely detachable. Mounting the hollow fiber membrane modules 1 by using couplers particularly makes the maintenance service very easy.

The number of the hollow fiber membrane module 1 that constitute the hollow fiber membrane unit 11 may be determined freely. Also the single hollow fiber membrane module 1 may be used individually without forming a unit.

The bubble stream generator 4 and the circulation pump 29 may have constitutions similar to those of the bubble stream generator 4 and the pump 8 of the first embodiment.

Although not shown in the drawings, a heating device is preferably installed outside the processing tank 7 for heating the crude oil contained in the processing tank 7 or maintaining the temperature thereof. The heating device may have a constitution similar to that of the heating device 6 of the first embodiment.

To separate water from the crude oil using such a crude oil processing apparatus as described above, first the crude oil is supplied from the crude oil supply pipe 28 into the crude oil tank 21 for temporary storage. Then the circulation pump 29 is started to pump the crude oil through the circulation pipe 30 into the processing tank 7. Since any excess of the crude oil in the processing tank 7 is returned through the overflow pipe 22 to the crude oil tank 21, the crude oil level $L_1$ in the tank is maintained at the position of the inlet port 22a of the overflow pipe 22.

On the other hand, gas is supplied from the blower 9 to the bubble stream generator 4, to carry out bubbling below the hollow fiber membrane unit 11. The crude oil contained in the processing tank 7 is preferably heated and kept at a proper temperature by means of a heating device (not shown).

Under these conditions, the pressure difference due to gravity is applied to the hollow fiber membrane unit 11 in the processing tank 7, because there is a level difference between the height of the crude oil surface $L_1$, and the distal end 23a of the removal pipe 23, so that the pressure acting on the hollow fiber membrane unit 11 drives the crude oil to separate water therefrom through gravitational filtration of the crude oil in the processing tank 7.

Specifically, the oil (dehydrated oil), that can pass the hollow fiber membrane 2, of the crude oil contained in the processing tank 7 passes through the hollow fiber membranes 2, the oil collecting pipe 3, the major oil collecting pipe 12 and the removal pipe 23 to be taken out of the processing tank 7 and is stored in the dehydrated oil tank 25.

On the other hand, the water content of the crude oil cannot pass through the hollow fiber membrane 2 and settles overtime due to the difference in the specific gravity thereby forming at the bottom of the processing tank 7 a separated water layer 10 that may be occasionally discharged through the water drainage port 5. Muddy matter included in the crude oil also cannot pass through the hollow fiber membrane 2, and settles due to gravity, that can be discharged together with the water of the separated water layer 10 through the water drainage port 5. Since much of natural gas dissolved in the crude oil passes through the hollow fiber membrane 2 and is taken out together with the dehydrated oil, it is preferable to carry out degassing in the dehydrated oil tank 25. The natural gas obtained by the degassing process can be supplied to the bubble stream generator 4 and reused as the bubbling gas, which is advantageous for decreasing the running cost.

The crude oil level $L_1$ in the processing tank 7 can be changed by moving the liquid inlet 22a up or down by a cylinder device 27, thereby controlling the pressure acting on the hollow fiber membrane unit 11. As a result, the flow velocity of the oil passing through the hollow fiber membrane unit 11 can be controlled as required when initially setting up the operation or when there is insufficient pressure for driving the operation. Or, alternatively, the flow velocity of the oil passing through the hollow fiber membrane unit 11 can also be controlled by operating a flow control valve 24 installed in the removal pipe 23, thereby regulating the back pressure applied to the hollow fiber membrane unit 11.

Gravitational filtration with the hollow fiber membrane unit 11 can also be carried out intermittently by operating the flow control valve 24 installed in the removal pipe 23, which is desirable for preventing any muddy matter that has been filtered out from accumulating on the membrane surface of the hollow fiber membrane 2 around the pores thereof, which would occur in the case of continuous filtration. When filtration is stopped by closing the flow control valve 24, bubbles generated by the bubble stream generator 4 wash the surface of the hollow fiber membranes 2 by dispersing any solid deposit there by cleaning the membrane surface. This provides the advantage that the surfaces of the hollow fiber membranes 2 can be kept clean without backwash, thereby reducing the requirements for the maintenance facility or the maintenance services.

The hollow fiber membrane 2 can be back-washed with an air stream flowing to the hollow fiber membrane unit 11, by connecting an air supply tube, not shown in the drawing, to the removal pipe 23 that connects the flow control valve 24 and the hollow fiber membrane unit 11, and supplying air while the flow control valve 24 is closed and filtration is stopped. Carbon dioxide gas, nitrogen gas, liquefied petroleum gas (LPG) or the like may be used instead of air, and also the dehydrated oil from which water has been separated may be made to flow in reverse, instead of a gas, to carry out backwash.

According to the crude oil processing method that uses the apparatus of this embodiment as described above, the crude oil level $L_1$, in the processing tank 7 can be maintained at a predetermined height, and a liquid pressure that corresponds to the difference between the liquid level $L_1$ and the surface level of the dehydrated oil in the dehydrated oil tank 25 can be applied to the hollow fiber membrane unit 11. Since gravitational filtration of the crude oil is carried out by utilizing the pressure difference caused by gravity, the oil-water separation process of the crude oil by means of the hollow fiber membrane 2 can be carried out without supplying a particular driving power from the outside. As a consequence, the processing tank 7 can be an open system and it is not necessary to process the gas generated from the crude oil in the processing tank 7. Since the pressure of the crude oil changes more gradually as the oil passes through the membrane in the case of gravitational filtration, far less of the dissolved gas in the crude oil is released by the pressure difference across the membrane. Also because the oil-water separation process can be carried out efficiently without waiting for the water content to precipitate due to the difference in the specific gravity as in the prior art, it is possible to process a large quantity of crude oil in a small apparatus. If heavy oil or bitumen is used as the crude oil, it may be necessary to make the difference in the liquid level larger depending on the processing apparatus temperature, because of the higher viscosity and larger specific gravity even after being processing.

Since the crude oil is filtered by using the hollow fiber membrane 2, a high degree of separation and removal of water from the crude oil can be done regardless of the properties of the crude oil, and muddy matter can also be separated and removed, thereby producing the dehydrated oil that has a lower water content with no muddy matter contained therein.

Also because the hollow fiber membranes 2 are used in this embodiment, a larger area of the membrane surface per unit volume, that is effective for the filtration of crude oil, is provided, thus resulting in high efficiency of processing. Also, because a plurality of hollow fiber membranes 2 are combined into a module and used in a unit construction, ease of handling of the hollow fiber membrane 2 is improved.

Figure 6:
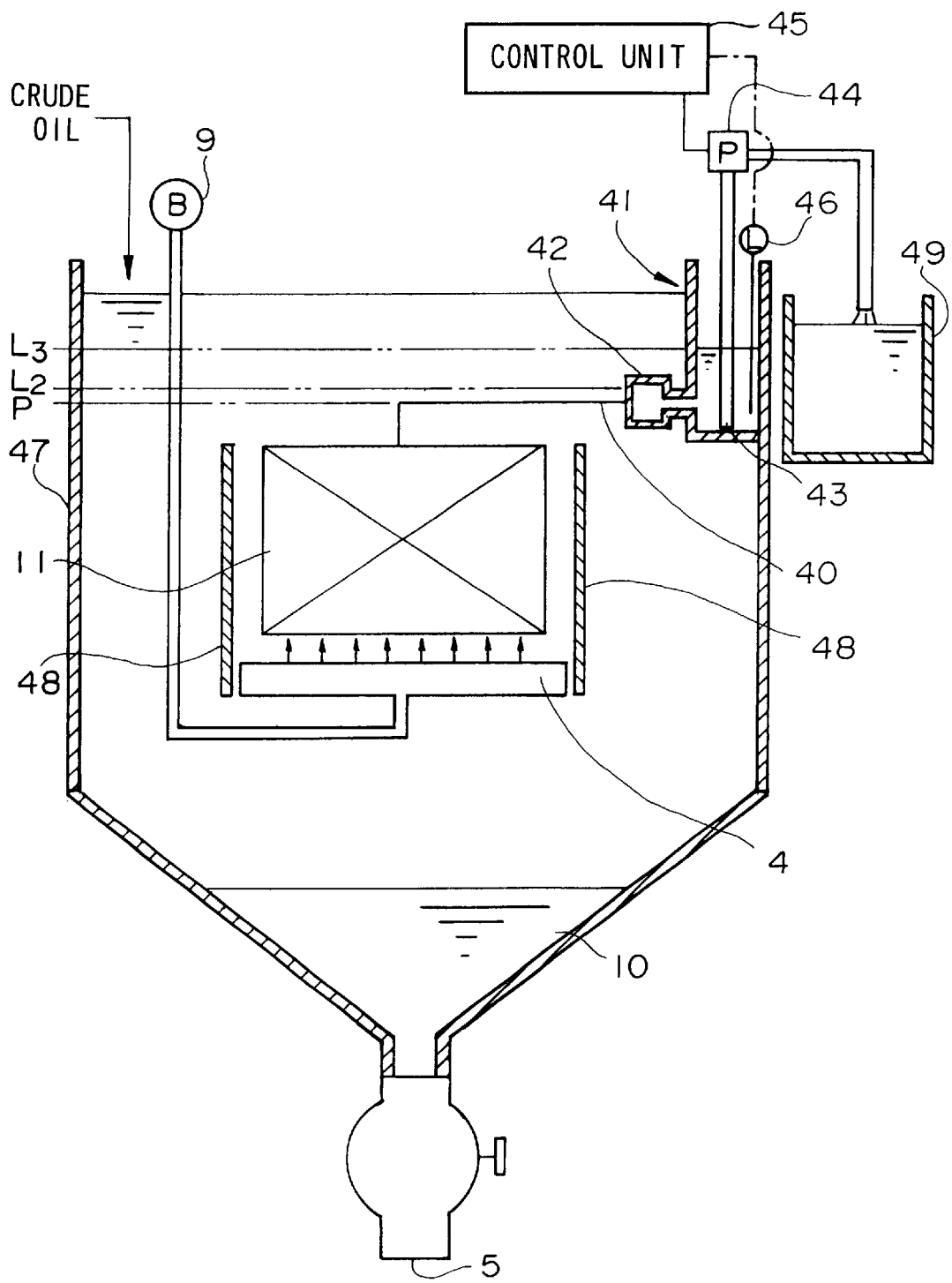
FIG. 6 is a schematic constitution diagram showing the third embodiment of the crude oil processing apparatus according to the present invention.

FIG. 6 shows the third embodiment of the crude oil processing apparatus of the present invention. In this drawing, components identical with those shown in FIGS. 1 through 5 will be identified with the same reference symbols and description thereof will be omitted.

In this embodiment, a processing tank 47 has a water drainage port 5 provided at the bottom thereof, and a liquid level control chamber 41 that is separated with a bulkhead is installed in the upper portion. The processing tank 47 stores crude oil therein with the hollow fiber membrane unit 11 being immersed in the crude oil.

The hollow fiber membrane unit 11 is disposed so that the direction parallel to the surface of the screen section 2a and the longitudinal direction of the oil collecting pipe 3 are vertical (perpendicular to the liquid surface) and the major oil collecting pipe 12 is located on the upper side thereof, while one end of a removal pipe 40 is connected to the major oil collecting pipe 12. The other end of the removal pipe 40 is connected to a header 42 that communicates with the liquid level control chamber 41 at a connecting position P that is higher than the upper end of the hollow fiber membrane unit 11. Thus the processing tank 47 and the liquid level control chamber 41 communicate with each other via the hollow fiber membrane unit 11 at the connecting position P, so that the dehydrated oil that has been filtered by the hollow fiber membrane unit 11 is stored in the liquid level control chamber 41.

Installed below the hollow fiber membrane unit 11 in the processing tank 47 is the bubble stream generator 4 which is connected to the blower 9. A cylindrical shield 48 is disposed around the bubble stream generator 4 and the hollow fiber membrane unit 11, to prevent the bubbles generated by the bubble stream generator 4 from escaping out of the hollow fiber membrane unit 11.

Installed in the liquid level control chamber 41 is a pump 44 provided with a liquid lifting pipe 43 that opens at the bottom of the chamber, through which the dehydrated oil in the liquid level control chamber 41 can be sent to the dehydrated oil tank 49. The liquid level control chamber 41 has a liquid level meter 46 installed therein, the liquid level meter 46 and the pump 44 being connected to a controller 45, so that the liquid level in the liquid level control chamber 41 can be regulated by controlling the pumping up of the oil by the pump 44. The pump 44 has an explosion-proof construction, and may be of a similar type to that of the pump 8 of the first embodiment.

The liquid level in the liquid level control chamber 41 is controlled to remain between pump-up stopping position $L_2$, that is set to be higher than the connecting position P of the removal pipe 40 and the header 42, and pump-up starting position $L_3$ that is a position properly set above the pump-up stopping position $L_2$.

A constitution in which the hollow fiber membrane unit 11 is moved in the processing tank 47 may be employed as in the second embodiment, while it is preferable to install a heating device for heating the crude oil contained in the processing tank 47 and maintaining the temperature thereof.

While the liquid level control chamber 41 is installed adjacent to the processing tank 47 in this embodiment, the processing tank 47 and the liquid level control chamber 41 may also be installed independently at a distance from each other.

To separate water from the crude oil using such a crude oil processing apparatus as described above, first the crude oil is supplied into the processing tank 47, with the hollow fiber membrane unit 11 immersed therein, and bubbles are generated from the bubble stream generator 4.

If the liquid level in the processing tank 47 is higher than the liquid level in the liquid level control chamber 41, a pressure difference corresponding to the difference between both levels due to gravity causes gravitational filtration of the crude oil in the processing tank 47 by means of the hollow fiber membrane unit 11, thereby separating the oil and water. That is, the oil content (dehydrated oil), of the crude oil contained in the processing tank 47, which can pass through the hollow fiber membrane 2, passes through the hollow fiber membrane 2, the oil collecting pipe 3, the major oil collecting pipe 12, the removal pipe 40 and the header 42, to flow into the liquid level control chamber 41. The water content of the crude oil cannot pass through the hollow fiber membrane 2 and settles over time due to the difference in the specific gravity, thereby forming at the bottom of the processing tank 47 the separated water layer 10 that may be occasionally discharged through the water drainage port 5. Muddy matter included in the crude oil also cannot pass through the hollow fiber membrane 2, and settles due to gravity and can be discharged together with the water of the separated water layer 10 through the water drainage port 5. Since much of the natural gas dissolved in the crude oil passes through the hollow fiber membrane 2 and is taken out together with the dehydrated oil, it is preferable to carry out a degassing process, for example, in the dehydrated oil tank 49. Natural gas obtained by the degassing process may be supplied to the bubble stream generator 4 and reused as the bubbling gas, which is advantageous for decreasing the running costs.

Dehydrated oil in the liquid level control chamber 41 is discharged by the pump 44 to the dehydrated oil tank 49, and the liquid level in the liquid level control chamber 41 is maintained by the pump 44 between the pump-up stopping position $L_2$ and the pump-up starting position $L_3$. If heavy oil or bitumen is used as the crude oil, it may be necessary to increase the difference in the liquid level depending on the processing apparatus temperature, because of the high viscosity and the specific gravity.

If the supply of the crude oil to the processing tank 47 is stopped at the same time the pump 44 is stopped, thereby stopping the discharging of the dehydrated oil from the liquid level control chamber 41, the liquid levels in the liquid level control chamber 41 and in the processing tank 47 eventually become the same, making the gravitational filtration with the hollow fiber membrane 2 stop because the pressure due to the level difference is not applied to the hollow fiber membrane unit 11. Thus repeating this operation of filtration intermittently has the advantage of preventing the problem of clogging, since the surface of the hollow fiber membrane 2 is washed by the bubbles generated by the bubble stream generator 4 at intervals.

According to the crude oil processing method that uses the apparatus of this embodiment as described above, since the dehydrated oil level in the liquid level control chamber 41 can be maintained within a predetermined range, a liquid pressure that corresponds to the difference between the crude oil level in the processing tank 47 and the surface level of the dehydrated oil in the liquid level control chamber 41 can be applied to the hollow fiber membrane unit 11. Thus the oil-water separation process of the crude oil by means of the hollow fiber membrane 2 can be carried out without supplying a particular driving power from the outside. Also because the processing tank 47 can be an open system, it is not necessary to process the gas generated from the crude oil in the processing tank 47. Since the pressure of the crude oil changes more gradually as the oil passes through the membrane in the case of gravitational filtration, far less dissolved gas in the crude oil is released by the pressure difference across the membrane. Also because the oil-water separation process can be carried out efficiently without waiting for the water content to precipitate due to the difference in the specific gravity as in the prior art, it is possible to process a large quantity of crude oil in a small apparatus.

In case of a problem such as clogging of the hollow fiber membrane 2 resulting in a reduced quantity of filtrate obtained through the hollow fiber membrane 2, discharging of the dehydrated oil from the liquid level control chamber 41 is stopped. Therefore, there is no possibility of the hollow fiber membrane unit 11 being exposed to the atmosphere.

Since gravitational filtration of the crude oil is carried out by using the hollow fiber membrane 2 in this embodiment, effects similar to those of the first embodiment such as a reduced water content of the dehydrated and elimination of muddy matter contained therein can be achieved efficiently.

Although the hollow fiber membrane 2 is used in the first through third embodiments, any membrane made of a porous material other than the hollow fiber membrane 2 may also be employed as long as the membrane selectively allows only the oil content included in the crude oil to pass therethrough. The porous membrane employed preferably has a hydrophobic or water repellent surface.

Porous membranes that can be employed other than the hollow fiber membrane 2 include SiC, carbon, alumina, activated alumina, glass, (cordierite), mullite, lithium aluminum silicate, aluminum titanate and other porous ceramics, and porous sintered materials made from powder of Ni, Cu, Al, Ti, Fe, Co and alloys thereof. It is preferable to subject such a porous material to a water-repellancy treatment. For example, silicone resin, acrylic resin, polyethylene resin, fluorocarbon resin, various coupling agent or other water-repellent material may be used, and the porous material may be dipped in a solution of such a water-repellent material in a solvent, emulsion liquid or a liquefied gas including the material dispersed therein, and dried.

Or, alternatively, a powder such as a fluorocarbon resin, polyethylene resin, polypropylene resin or acrylic resin may be molded and sintered to make the porous membrane. Such a sintered molding can be obtained by either filling a die having a cavity of desired shape with the resin powder and heating the die to a temperature not less than the melting point of the resin, or charging the powder in the form of a sheet into a heating furnace thereby fusing the powder particles to consolidate, and then cooling down.

Figure 7:
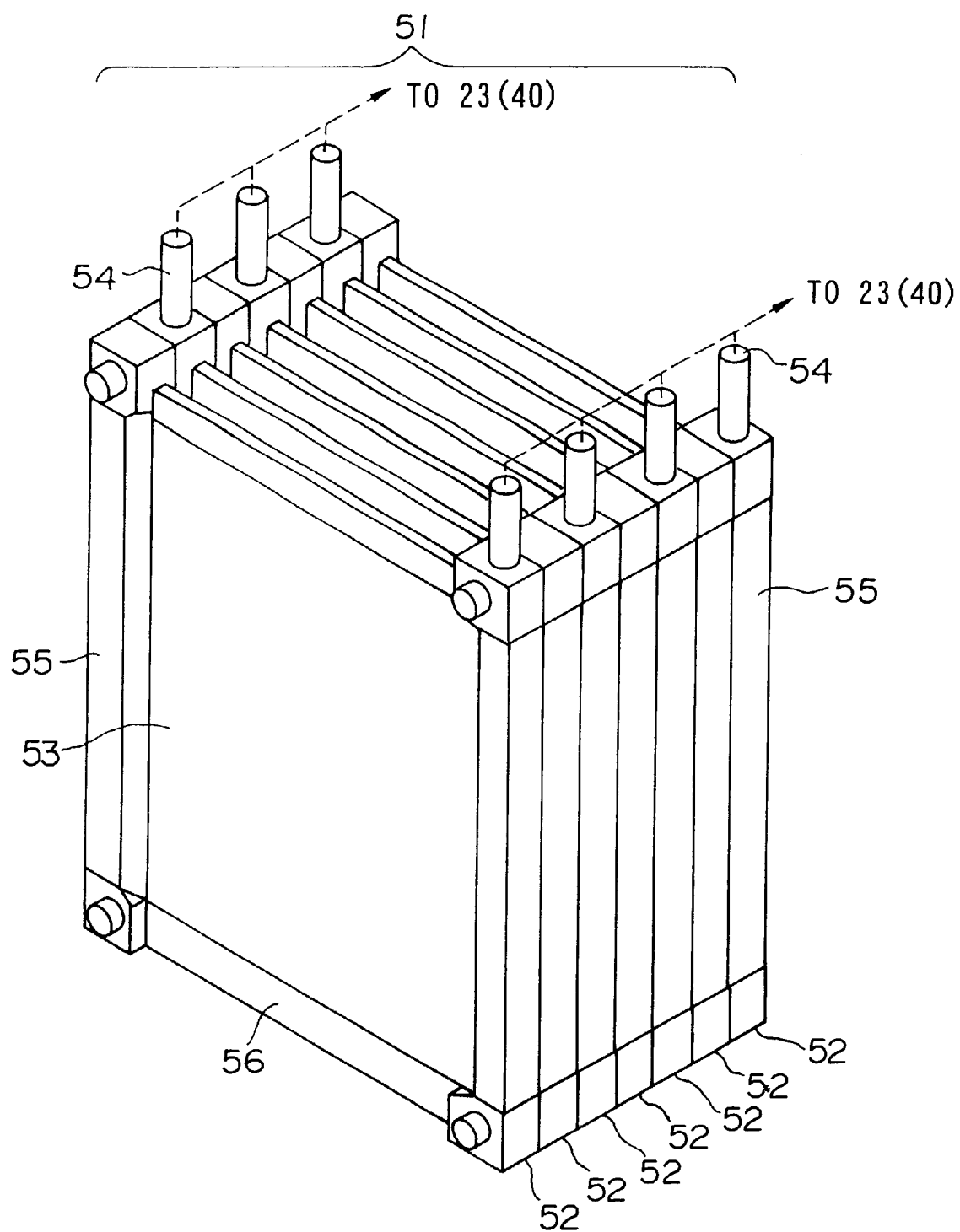
FIG. 7 is a perspective view showing an example of flat membrane unit.
Figure 8:
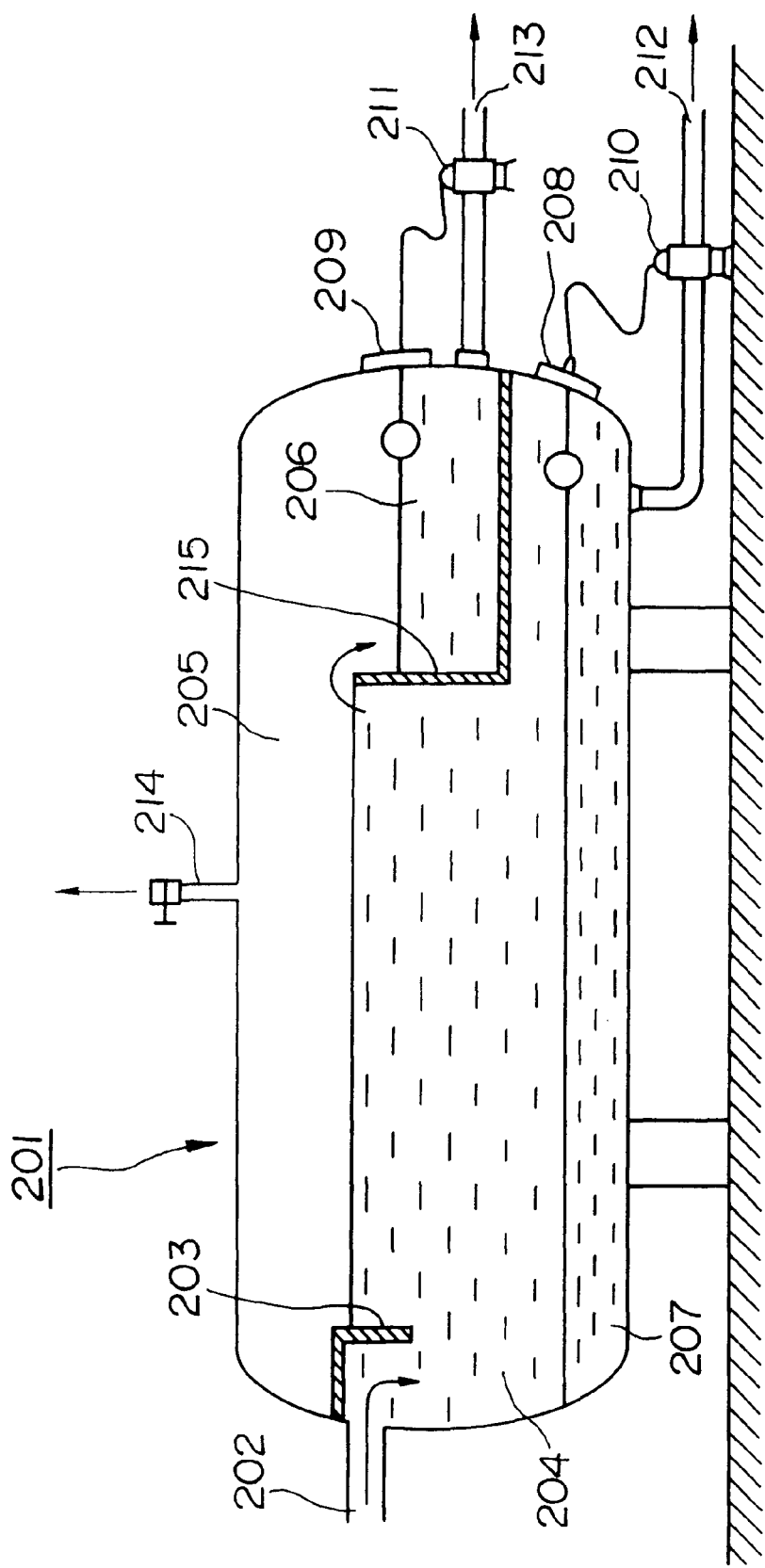
FIG. 8 is a schematic constitution diagram showing a separator used for processing crude oil in the prior art.

The porous membrane may have a configuration of a flat membrane, and a flat membrane element 52 shown in FIG. 7 or a flat membrane unit 51 comprising a plurality of the flat membranes stacked one on another may be used.

The flat membrane element 52 in this example is made by disposing two flat membranes 53 in parallel, while communicating the space between these membranes on one side thereof with an oil collecting pipe 55, and sealing the space on the other three sides thereof. The oil collecting pipe 55 is provided with a dehydrated oil removal port 54, and the removal pipe 23 (or 40) may be connected to the dehydrated oil removal port 54.

Besides those described above, a constitution in which a tubular membrane, having the inner space thereof being communicated with the removal pipe may be used.

Also in the case of using the flat membrane 53 or the tubular membrane, a high degree of water separation from the crude oil can be carried out efficiently, similarly to the case of using the hollow fiber membrane module 1. If using the flat membrane, in particular, the membrane surface can be washed easily and has the advantage of suitability to volume production of the module.

The method of controlling the surface levels of the crude oil and the dehydrated oil is not limited to those of the embodiments described above, and any known method may be applied.

Now the effects of the present invention will be shown by way of specific examples.

EXAMPLE 1

Crude oil (light oil) was separated into oil and water by using the crude oil processing apparatus shown in FIG. 1.

EHF540T (trade name, manufactured by Mitsubishi Rayon Co., Ltd.), made of polyethylene, with a mean pore diameter of 0.1 $\mu$m, a void ratio of 72%, an inner diameter of 360 $\mu$m and a membrane thickness of 90 $\mu$m was used for the hollow fiber membrane 2. The hollow fiber membranes 2 were disposed in parallel in the form of a screen, with both ends being fastened by bonding with an epoxy-based potting agent and then made open. Open ends on both sides were fastened in communication with the oil collecting pipe 3, thereby forming the hollow fiber membrane module 1(effective length 800 mm, membrane area 4 m$^2$ ).

Eight pieces of the hollow fiber membrane module 1 were used to form the hollow fiber membrane unit 11 shown in FIG. 3 and FIG. 4, that was installed in the processing tank 7, with the bubble stream generator 4 disposed below it. The processing tank 7 was closed and crude oil (light oil including 20% of water content) was supplied by the pump 8 into the processing tank 7. The pressure difference across the membrane was maintained at 0.05 MPa and the crude oil temperature in the processing tank 7 was maintained at 60° C. by heating.

After keeping this condition for 60 minutes, the pump 8 was stopped and the membrane surface was washed for five minutes. Specifically, the processing tank 7 was switched from closed to open, and air was supplied from the blower 9 to the bubble stream generator 4 thereby to effect bubbling below the hollow fiber membrane module 1. The flow rate of the air per unit sectional area of the hollow fiber membrane module 1 in the horizontal plane was set to 75 $Nm^3/m^2 \cdot h$. At the same time, with the backwash valve 35 opened and the dehydrated oil valve 37 closed, the backwash pump 33 was started and the backwash control valve 36 was adjusted, thereby passing the dehydrated oil in the reverse direction through the oil collecting pipe 3 to the hollow fiber membrane 2. Backwash was carried out for a period of 10 to 30 seconds at a pressure of 0.07 MPa.

Pressured filtration and cleaning of the membrane surface were repeated for 100 cycles, and flow rate of filtrate and the water content in the dehydrated oil were measured at the start and end of the cycling process. The results of the measurement are shown in Table 1. The water content was measured with a trace water measuring instrument CA-06 (Carl-Fischer method) manufactured by Mitsubishi Chemical Co., Ltd.

EXAMPLE 2

The crude oil processing apparatus was made similarly to the first example, except for using KPF190M (trade name, manufactured by Mitsubishi Rayon Co., Ltd.), made of polypropylene, with a mean pore diameter of 0.04 $\mu$m, a void ratio of 49%, an inner diameter of 200 $\mu$m and a membrane thickness of 22 $\mu$m for the hollow fiber membrane 2, thereby processing the crude oil.

Similarly to the first example, the flow rate of filtrate and the water content in the dehydrated oil were measured at the start and end of the cycling process. The results of the measurement are shown in Table 1.

TABLE 1

|  | Filtration flow rate $(1/(m^2 \cdot h))$ Water | | Content of dehydrated oil (%) | |
| --- | --- | --- | --- | --- |
|  | The start of the cycling process | The end of the cycling process | The start of the cycling process | The end of the cycling process |
| Example 1 | 92 | 93 | 0.2 | 0.2 |
| Example 2 | 36 | 36 | 0.02 | 0.02 |

Results of the first example and the second example showed that there was no significant drop in the flow rate of filtrate between the times at the start and end of the cycling process and achieved water contents in the dehydrated oil as low as 0.2% and 0.02%, respectively, while the water content did not change between start and end of the cycling process. Thus it was verified that the crude oil processing apparatus and the crude oil processing method of the present invention are capable of carrying out a high degree of separation and removal of water content from the crude oil without using a surfactant or applying a high voltage, and the process can be continued for a long period of time in a stable condition.

Industrial Applicability

According to the crude oil processing method of the present invention, since a high degree of separation and removal of water content from the crude oil can be accomplished regardless of the properties of the crude oil, crude oil of high quality free of muddy matter that is suitable for refinery and production can be obtained.

The crude oil processing apparatus of the present invention provides high processing efficiency and allows it to make the processing facility smaller. As a consequence, equipment investment and the running cost can be reduced, and the limitations on the site of the facility can be mitigated, while ensuring high versatility.

What is claimed is:

1. An apparatus comprising:
   a processing tank having a water drainage port provided at the bottom thereof;
   a membrane that is installed in the processing tank and selectively allows the oil content in a crude oil to pass therethrough;
   wherein said membrane is installed movably in the processing tank and a driving means which moves said membrane is provided;
   a means which pressurizes the crude oil; and
   a removal pipe for removing dehydrated oil that has passed through said membrane.

2. The apparatus according to claim 1, wherein said crude oil is heavy oil or bitumen.

3. The apparatus according to claim 1, wherein said membrane is at least one kind selected from the group consisting of a hollow fiber membrane, flat membrane and tubular membrane.

4. The apparatus according to claim 1, wherein said membrane is a hydrophobic hollow fabric.

5. The apparatus according to claim 1, wherein said membrane is a hollow fiber membrane with a pore diameter 1.0 $\mu$m or smaller.

6. The apparatus according to claim 1, wherein a hollow fiber membrane module comprising a plurality of hollow fiber membranes disposed substantially in parallel to each other is used for said membrane.

7. The apparatus according to claim 6, wherein a plurality of said hollow fiber membrane modules are combined into a unit.

8. The apparatus according to claim 1, further comprising a means which heats the inside of said processing tank and maintains a raised temperature.

9. The apparatus according to claim 1, wherein a bubble stream generator is provided below said membrane in said processing tank.

10. The apparatus according to claim 1, wherein said membrane is a hydrophilic hollow fiber fabric having a hydrophobic surface.

11. The apparatus according to claim 1, wherein said membrane is a hollow fiber membrane with a pore diameter 0.2 $\mu$m or smaller.

12. The apparatus according to claim 1, wherein said membrane is a hollow fiber membrane with a void ration from 20 to 90%.

13. An apparatus comprising:
   a processing tank having a water drainage port provided at the bottom thereof;
   a membrane that is installed in the processing tank and selectively allows the oil content in a crude oil to pass therethrough;
   wherein said membrane is installed movable in the processing tank and a driving means which moves said membrane is provided; and
   a removal pipe that communicates on one end thereof with a passage of the dehydrated oil that has passed said membrane and opens on the other end thereof at a position lower than the crude oil surface in the processing tank.

14. The apparatus according to claim 3, wherein said crude oil is heavy oil or bitumen.

15. The apparatus according to claim 13, wherein said membrane is at least one kind selected from the group consisting of a hollow fiber membrane, flat membrane and tubular membrane.

16. The apparatus according to claim 13, wherein said membrane is a hydrophobic hollow fabric.

17. The apparatus according to claim 13, wherein said membrane is a hollow fiber membrane with a pore diameter 1.0 mg or smaller.

18. The apparatus according to claim 13, wherein a hollow fiber membrane module comprising a plurality of hollow fiber membranes disposed substantially in parallel to each other is used for said membrane.

19. The apparatus according to claim 18, wherein a plurality of said hollow fiber membrane modules are combined into a unit.

20. The apparatus according to claim 13, further comprising a means which heats the inside of said processing tank and maintains a raised temperature.

21. The apparatus according to claim 13, wherein a bubble stream generator is provided below said membrane in said processing tank.

22. The apparatus according to claim 13, wherein said membrane is a hydrophilic hollow film fabric having a hydrophobic surface.

23. The apparatus according to claim 13, wherein said membrane is a hollow fiber membrane with a pore diameter 0.2 $\mu$m or smaller.

24. The apparatus according to claim 13, wherein said membrane is a hollow fiber membrane with a void ratio of from 20 to 90%.

25. The apparatus according to claim 13, further comprising a liquid level control means which maintains the level of dehydrated oil within a predetermined range in said control means to ensure a pressure differential between a crude oil level in said processing tank and a dehydrated oil level in said control means to apply liquid pressure to said membrane.

26. A method comprising immersing a membrane module in crude oil contained in a processing tank, pressurizing the crude oil to pass through the membrane, moving said membrane in said processing tank, and removing the dehydrated oil that has passed therethrough through an oil collecting pipe.

27. The method according to claim 12, wherein said crude oil is heavy oil or bitumen.

28. A method comprising immersing a membrane module in crude oil contained in a processing tank, conducting gravitational filtration to make the crude oil pass through said membrane, moving said membrane in said processing tank, and removing the dehydrated oil obtained in the gravitational filtration through an oil collecting pipe.

29. The method according to claim 28, wherein said crude oil is heavy oil or bitumen.

* * * * *